(12) United States Patent
Mahendran et al.

(10) Patent No.: US 7,720,024 B2
(45) Date of Patent: May 18, 2010

(54) METHOD AND APPARATUS FOR OBTAINING SERVER INFORMATION IN A WIRELESS NETWORK

(75) Inventors: Arungundram C. Mahendran, Irvine, CA (US); Jun Wang, La Jolla, CA (US); Raymond Tah-Sheng Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1226 days.

(21) Appl. No.: 11/095,973

(22) Filed: Mar. 30, 2005

(65) Prior Publication Data

US 2005/0249223 A1    Nov. 10, 2005

Related U.S. Application Data

(60) Provisional application No. 60/558,796, filed on Mar. 31, 2004.

(51) Int. Cl.
*G06F 15/16* (2006.01)
(52) U.S. Cl. .................. 370/328; 370/352
(58) Field of Classification Search .......... 370/352, 370/254, 392, 328; 455/432.1, 433, 558
See application file for complete search history.

(56) References Cited

U.S. PATENT DOCUMENTS

2004/0047322 A1    3/2004   O'Neill

2004/0223465 A1 *  11/2004   Lee et al. ............... 370/313

FOREIGN PATENT DOCUMENTS

| EP | 1058417 | 12/2000 |
|---|---|---|
| EP | 1073234 | 1/2001 |
| GB | 2375022 | 1/2009 |
| JP | 2003-273890 | 9/2003 |
| KR | 20020091791 | 12/2002 |
| WO | 02087192 | 10/2002 |

OTHER PUBLICATIONS

Floris, Veltri: "Roaming Scenarios Based on SIP" MMNS 2002, LNCS 2496, 2002, pp. 302-314, XP009049273.

Dutta A et al: "Realization of Integrated Mobility Management Protocol for Ad-Hoc Networks" Military Communications Conference. MILCOM 2002. Proceedings. Anaheim, CA, Oct. 7-10, 2002, IEEE Military Communications Conference, New York, NY: IEEE, US, vol. 1 of 2, Oct. 7, 2002, pp. 448-454, XP010632144.

(Continued)

*Primary Examiner*—Sam Bhattacharya
(74) *Attorney, Agent, or Firm*—Kam T. Tam; Howard H. Seo (57) ABSTRACT

In a communications system where a mobile node seeks to establish contact with a server node within or outside the home network of the mobile node by first providing the general location information and the server type of the server node to a DHCP (Dynamic Host Configuration Protocol) server. The DHCP server then matches the provided information with its record in storage to arrive at an IP (Internet Protocol) address of the sought server node. The DHCP server then sends the IP address to the mobile node, thereby allowing the mobile node to directly access the server node.

31 Claims, 6 Drawing Sheets

OTHER PUBLICATIONS

Droms R: "RFC 2131—Dynamic Host Configuration Protocol (DHCP)" IETF RFC, Mar. 1997, XP002193184.

Schultzrinne, Volz: "DHCPv6 Options for SIP Servers" RFC 3319, Jul. 2003, XP002332831.

Schulzrinne Columbia University H: "Dynamic Host Configuration Protocol (DHCP-for-IPv4) Option for Session Initiation Protocol (SIP) Servers" IETF Standard, Internet Engineering Task Force, IETF, CH, Aug. 2002, XP015009120.

Perkins C (Editor): "IP Mobility Support, RFC 2002" IETF RFC, Oct. 1996, XP002233555.

International Search Report—PCT/US2005/010896, International Search Authority—European Patent Office—Jul. 4, 2005.

Written Opinion—PCT/US2005/010896, International Search Authority—European Patent Office—Jul. 4, 2005.

International Preliminary Report on Patentability—PCT/US2005/010896, International Search Authority—IPEA/US—Alexandria, Virginia—Jun. 14, 2006.

Alexander, "DHCP Option and BOOTP Vendor Extensions," RFC 2132, Network Working Group, Mar. 1997.

Dodds, "Survey of New-Protocol TELNET Servers," RFC #703, Network Working Group, Jul. 1975.

Droms, et al., "Dynamic Host Confguration Protocol for IPv6 (DHCPv6)," Network Working Group, Jul. 2003.

"Internet Protocol," RFC 791, DARPA Internet Program Protocol Specification, Sep. 1981.

Yokota, "Construction Guide to Windows Server 2003," Network Magazine, Japan: ASCII Corporation, Dec. 1, 2003, vol. 3, No. 12, pp. 196-169.

\* cited by examiner

METHOD AND APPARATUS FOR OBTAINING SERVER INFORMATION IN A WIRELESS NETWORK

CLAIM OF PRIORITY UNDER 35 U.S.C § 119

The present application for Patent claims priority to U.S. Provisional Application No. 60/558,796, entitled "Method and Apparatus for Obtaining Server Information in a Wireless Network," filed Mar. 31, 2004, and assigned to the assignee hereof and hereby expressly incorporated by reference herein.

BACKGROUND

I. Field

The present invention generally relates to packet data communications, and more particularly, to identifying server locations during packet data communications.

II. Background

Figure 1:
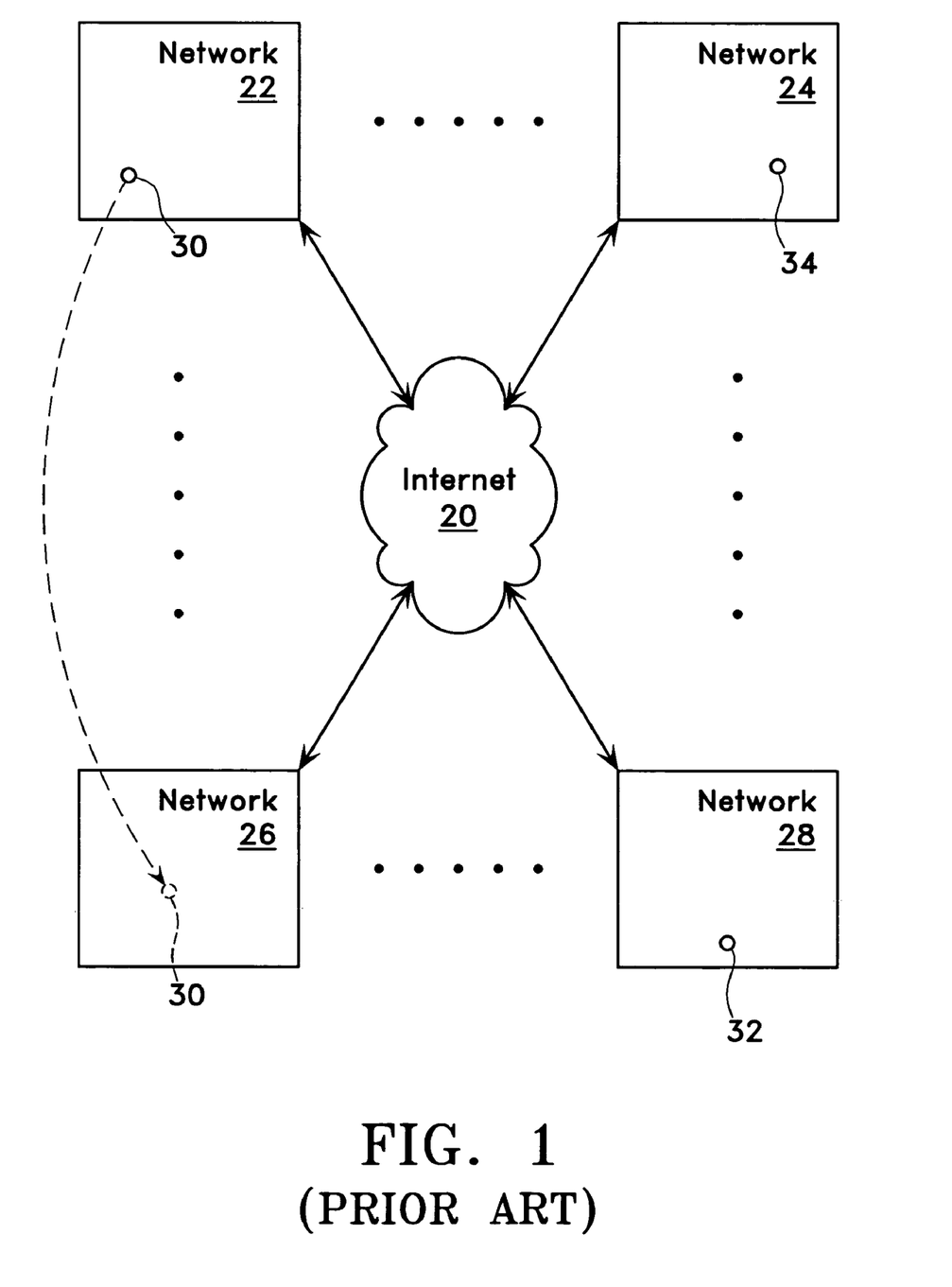
FIG. 1 is a schematic drawing of the global connection of networks.

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the TCP/IP (Transmission Control Protocol/Internet Protocol) promulgated by the IETF (Internet Engineering Task Force). The TCP/IP can be found in RFC (Request For Comments) 703 and RFC 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24, 26 and 28 tied to the Internet 20.

Within each of the networks 22, 24, 26 and 28, there can be various pieces of equipment connected to and in communication with each other. Examples are computers, printers, and servers, to name just a few. Each piece of equipment has a unique hardware address, commonly called the MAC (Media Access Control) address. The piece of equipment with the MAC address is sometimes called a node. When the node communicates beyond its own network via the Internet 20, an IP address needs to be assigned to the node.

The assignment of the IP address can be manual or automatic. The manual assignment of the IP address can be performed by a network administrator, for example. More often, the IP address is automatically assigned by a server called the DHCP (Dynamic Host Control Protocol) server residing inside in the node's network.

Returning now to FIG. 1, as an example, suppose a node 30 in the network 22 attempts to send a data packet to another node 32 in the network 28. Under the TCP/IP, each data packet needs to have a source address and a destination address. In this case, the source address is address of the node 30 in the network 22. The destination address is the address of the node 32 in the network 28.

As another example, when the node 30 in the network 22 tries to retrieve information from the node 34 in another network 24, such as in a web hosting session in which the node 34 serves as a web host, the node 30 must provide a proper IP address of the node 34 in the network 24 for such a session.

Advent in wireless technologies allows nodes to be detached from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, for instance, the node 30 may roam away from its home network 22 to a foreign network 26. Under such scenario, the original IP address assigned to the node 30 would no longer be applicable to the node 30. As such, data packets sent to the node 30 may not be reachable to the node 30.

The MIP (Mobile Internet Protocol) set forth by the IETF is intended to address the node mobility problems. In accordance with the RFC 2002 published by the IETF, the node 30 is assigned a "care-of address," abbreviated as CoA (Care-of Address). Under the RFC 2002, there are two types of CoA, namely, the FA CoA (Foreign Agent Care-of Address) and the CCoA (Co-Located Care of Address). The FA CoA is in essence the address of a FA (Foreign Agent) (not shown), which is a designated server in the foreign network where the node 30 is located at. The CCoA is an individual but temporary address assigned to the node 30 by the foreign network. In any case, anytime the node 30 is in a foreign territory, the node 30 must register the CoA, be it the FA CoA or the CCoA, with its home network 22, so that the home network 22 always knows the whereabouts of the node 30. After registration, the CoA is stored in the routing table maintained by a designated server, called the HA (Home Agent) (not shown), of the home network 22.

Take an example for illustration. Suppose the node 30 roams into the foreign network 26. Upon receipt of the advertisement from the foreign network 26, the node knows the FA address of the foreign network 26. The node 30 then registers the FA CoA with the home network 22. When the node 30 in the foreign network 26 sends out a data packet to the node 34 in the network 24, knowing the address of the node 34 in the network 24, the data packet can be sent straightforwardly. However, the reverse traffic may not be so straightforward.

In the reverse data route, when the node 34 in the network 24 attempts to send a data packet to the node 30, now in the foreign network 26, as mentioned above, in conformance with the TCP/IP, both the source and the destination addresses must be specified in the data packet. In this case, the source address is the IP address of the node 34 in the network 24. As for the destination address, the node 34 only knows the IP address of the node 30 assigned by its home network 22, called the HoA (Home assigned Address), not the FA CoA of the node 30. Thus, the destination address will be set at the HoA of the node 30. Nevertheless, since the FA CoA of the node 30 is stored in the routing table HA of the home network 22, when the data packet reaches the home network 22, the HA of the network 22 encapsulates the received data packet with the stored FA CoA and resend it to the node 30 in the foreign network 26. The encapsulated FA CoA serves as the destination address of the resent data packet. Once the foreign network 26 receives the rerouted data packet, the foreign network 26 merely strips away the encapsulated FA CoA and delivers the original packet to the mobile node 30.

Operating in such manner, a virtual data tunnel is said to be established between the node 34 in the network 24 and the node 30 roaming in the foreign network 26, all intended to be transparent to the users. This is despite the fact that in reality, the virtual tunnel actually involves three-way data communications.

Heretofore, while the node 30 is roaming, it is difficult and very often impossible for the node 30 to locate other nodes in other networks, even though the node 30 knows exactly the type of data it wants to access. Returning to the example immediately above, the node 30 in the foreign network 26 can send data packets to the node 34 in the network 24 because the node 30 knows the IP address of the node 34 well in advance. In reality, this is not always the case. Suppose, the node 30 merely knows the type of information to be accessed. The node 30 may even know the address of the network 24 which has a server holding information to be accessed. However, the node 30 does not know the exact IP address of the server node 34 and is consequently handicapped in reaching the node 34.

There is thus a need to provide a roaming node with ways to conveniently access server information located in different networks.

SUMMARY

In a communications system where a mobile node seeks to establish contact with a server node within or outside the home network, the mobile node first locates a DHCP (Dynamic Host Configuration Protocol) server. The mobile node then provides the general location and the server type of the sought server node to the DHCP server. The DHCP server then matches the provided information with its record in storage and arrives at an IP (Internet Protocol) address or a FQDN (Fully Qualified Domain Name) of the sought server node. The DHCP server then sends the IP address or the FQDN to the mobile node allowing the mobile node to directly contact the server node.

In a first embodiment, the mobile node roaming in a foreign network uses a FA CoA (Foreign Agent Care-of Address) to communicate with the DHCP server and to reach the sought server.

In a second embodiment, the mobile node roaming in the foreign network uses a CCoA (Co-Located Care of Address) to communicate with the DHCP server and thereafter with the sought server node.

In accordance with the invention, an inter-network roaming mobile node is designed to be capable of accessing information from any server in any network. These and other features and advantages of the invention will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well-known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 2:
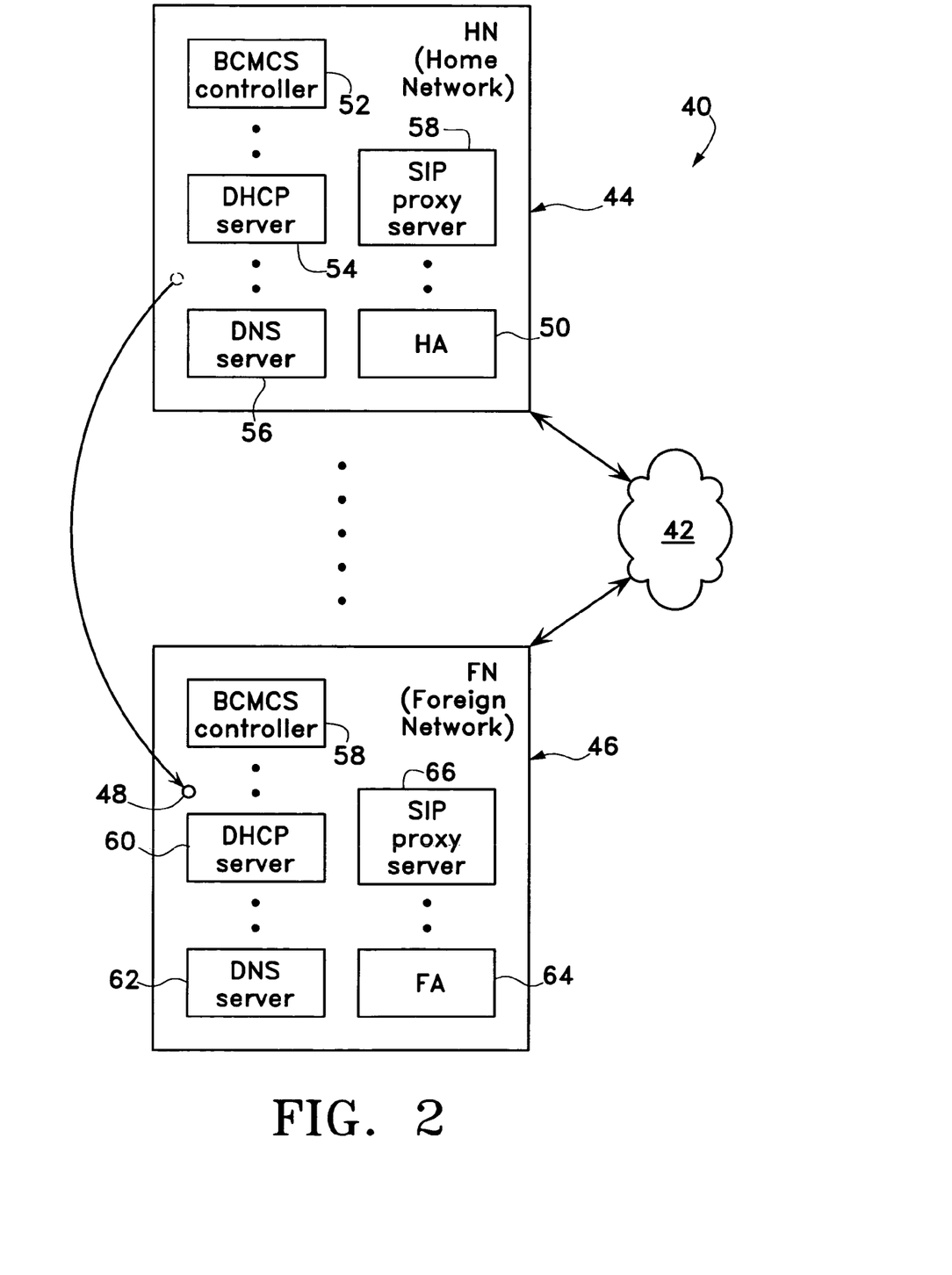
FIG. 2 is a schematic drawing showing a first embodiment of the invention.

Reference is now directed to FIG. 2 which schematically shows a first embodiment of the invention.

The overall system is generally signified by the reference numeral 40 which includes a backbone network 42, such as an intranet or the Internet. By way of example, as shown in FIG. 2, connected to the backbone network 42 are a HN (Home Network) 44 and a FN (Foreign Network) 46. For purposes of clarity and brevity in illustration, no other networks are specifically shown. In the system 40, there is a node 48 which is originally registered with the HN 44 but is capable of migrating to other foreign networks, such as the FN 46.

Herein below, few terms need to be defined. In accordance with the two standard versions of IP, IPv4 and IPv6, a node that is capable of moving and changing the connected network is called a "mobile node." The network to which the mobile node was originally connected is called "home network." A node that is present in the home network and takes charge during the absence of the mobile node is called a "home agent." A network to which the mobile node is actually connected to is called the "foreign network." A node that is present in the foreign network to look after the mobile node while it is in the foreign network is called a "foreign agent." A foreign network can sometimes be called a "visited network."

Reference is now returned to FIG. 2. In the HN 44, other than the mobile nodes 48, there are other nodes within the HA 44 but not shown for purpose of clarity. Such nodes can be computers of various scales, printers, and any other devices which can be mobile or non-mobile. Furthermore, in the HN 44, there is a HA (Home Agent) 50 which basically is a node carrying the duty of managing the data traffic within the HN 44 and also controlling the data traffic of the HN 44 for inbound and outbound routing.

Besides the HA 50, there are other dedicated nodes within the HN 44 performing different tasks. For instance, there are nodes such as a BCMCS (Broadcast Multicast Services) controller 52, a DHCP (Dynamic Host Control Protocol) server 54, a DNS (Domain Name System) server 56, and a SIP (Session Initiation Protocol) proxy server 58, to name just a few.

The BCMCS controller 52 is basically a server providing broadcast and multicast configuration information so as to allow users to peruse available broadcast or multicast sessions when requested by users.

The DHCP server 54 is installed to automatically assign IP addresses and other configuration parameters to the nodes in the HN 44 during start up, thereby allowing the nodes in HN 44 to communicate with other nodes in the system 40. The DHCP server 54 can also provide updated configuration information to the nodes during operation.

Sometimes data packets traveling in the system 40 are not specified with the 4-octet IP address commonly used under the IPv4, or the 16-octet format under the IPv6, but instead with domain names which are expressed in text. The DNS 56 basically translates domain names expressed in text into numeric IP addresses which are readable by machines in the system 40.

The SIP proxy server 58 essentially is an intermediary router playing the dual role of a host and a client in rerouting data packets on behalf of other client nodes.

Likewise, for simplicity and ease of explanation, the FN 46 is illustrated as substantially the same as the HN 44. It should be appreciated that, depending on usage, the FN 46 can be structured very differently. Thus, in this case, the FN 46 also includes, among other things, a BCMCS controller 58, a DHCP server 60, a DNS 62, and a SIP proxy server 66. Coordination of data traffic within and beyond the FN 46 is handled by the FA (Foreign Agent) 66.

Suppose the MN 48 is roaming in the FN 46. In this specific example, the MN 48 wants a video clip of a news event from a broadcast service in which the user of the MN 48 is a subscriber. The broadcast service can be a publisher or media organization servicing the public, for example. To satisfy the demand, the broadcast service has different BCMCS controllers installed in many networks, such as the HN 44 and the FN 46. The MN 48 wants to access either the BCMCS controller 52 in the HN 44 or the BCMCS controller 58 in the FN 46, but prefers the latter because the MN 48 is now in the FN 46 and thus has the proximity advantage.

In this embodiment, to access a BCMCS controller, the MN 48 seeks the assistance of either the DHCP server 54 in the HN 44 or the DHCP server 60 in the FN 46.

If the MN 48 knows the exact address of either one of the DHCP servers 54 or 60, the MN 48 can directly sends a DHCPINFORM message to the DHCP server 54 or 60. On the other hand, if the MN 48 does not have the direct address of any of the DHCP servers, the MN 48 can always perform a limited broadcast by sending the DHCPINFORM message to reach an available DHCP server. It should be noted that under the IPv6, the equivalent message is called INFORMATION REQUEST. In this specification, for consistency and clarity in describing the embodiments, the terminology of the IPv4 is used. It should be noted that a person of ordinary skill in the art can easily use the equivalent messages in IPv6 corresponding to the IPv4 messages to practice the invention.

Furthermore, under the DHCP promulgated by the IETF, various types of messages can be used to communicate with the DHCP server. For instance, during startup, that is, during the time when a node makes a request to have an IP address assigned, message types such as DHCPDISCOVER, DHCPOFFER, DHCPREQUEST, DHCPACK, etc., can be used. After startup, message types such as DHCPRELEASE, DHCPINFORM, DHCPACK, and so forth are also commonly used. Under the DHCP, there are various "options" in each message type available to the users for purpose of flexibility. The details of the DHCP and the available options are set forth in IETF's RFCs 2131, 2132 and 3315.

Under the DHCP, the DHCPINFORM message is normally used to change network parameters of an already configured node. In the DHCPINFORM message, there are options VCI (Vendor Class Identifier) and VSI (Vendor Specific Information) available as inputs. The two options VCI and VSI contain specific information to assist any DHCP server to properly configure a client node which may not be an ordinary node capable of routine configuration.

Heretofore, the DHCPINFORM message type is mostly used for intra-network configurations. In accordance with the invention, the DHCPINFORM message type is utilized for configurations between networks. First, the MN 48 needs to inform the DHCP host which network the sought server is located at. The MN 48 can meet this requirement by either providing the IP address or the FQDN (Fully Qualified Domain Name) of network of the server being sought. In this case, since the sought servers are located at either the HN 44 or the FN 46, the IP address or the FQDN of the HN 44 or FN 46 can be provided to meet this demand. Furthermore, the MN 48 needs also to tell the DHCP host what type of server the MN 48 is seeking. In this case, it is the BCMCS controller. It should be noted that even with these two basic pieces of information, the MN 48 is still unable to directly contact the sought server because the MN 48 does not have all the necessary information to arrive at a direct IP address reachable to the sought server. For example, the MN 48 does not have the MAC address or the domain name of the sought server to come up with a usable IP address.

To meet the aforementioned objective, in the DHCPINFORM message, the MN 48 fills in the VCI option with the IP address or the FQDN of the network with the server that the MN 48 wants to access.

The IP address or the FQDN of the network where the server is at and having the server that the MN 48 tries to reach can be extracted from various sources.

For instance, if the MN 48 wants the BCMCS controller 52 in the HN 44, the MN 48 can simply use its home address as the required IP address to submit to the DHCP server. As another option, the MN 48 can use the realm portion of its NAI (Network Access Identifier) which corresponds to the domain name of the home address of the MN 48.

If the MN 48 wants the BCMCS controller 58 in the FN 46, the MN 48 can extract the IP address of the FN 46 from its FA CoA which is available during the advertisement period by the FN 46 when the MN enters into the territory of the FN 46 so as to allow the MN 48 to register the FA CoA with the HN 44.

As for the type of server that the MN 48 is looking for, the MN 48 can fill in any available option of the DHCPINFORM message. Some exemplary options are the Router Option, the Name Server Option, the Domain Name Option, to name just a few. As mentioned before, in this example, the type of server the MN 48 wants is a BCMCS controller.

As an alternative, the IP name or the FQDN can be filled in the VSI option of the DHCPINFORM message, while the server type information can be filled in the other available options as aforementioned.

As yet another alternative, all the information needed, i.e., the IP name or the FQDN and the server type sought, can all be filled in either the VCI option or the VSI option.

Upon receipt of the DHCPINFORM message, the DHCP host maps the two pieces of information together by referring to the DHCP host's own storage record. If the DHCP host had prior dealings with the sought server, the transaction record with the information sought can normally be found. If a match is found, the sought server's IP address can be reconstructed and than conveyed in the VSI option in a DHCPACK message addressed to the MN 48. On the other hand, if no match is found, a DHCPNACK message is sent to the MN 48.

Figure 3:
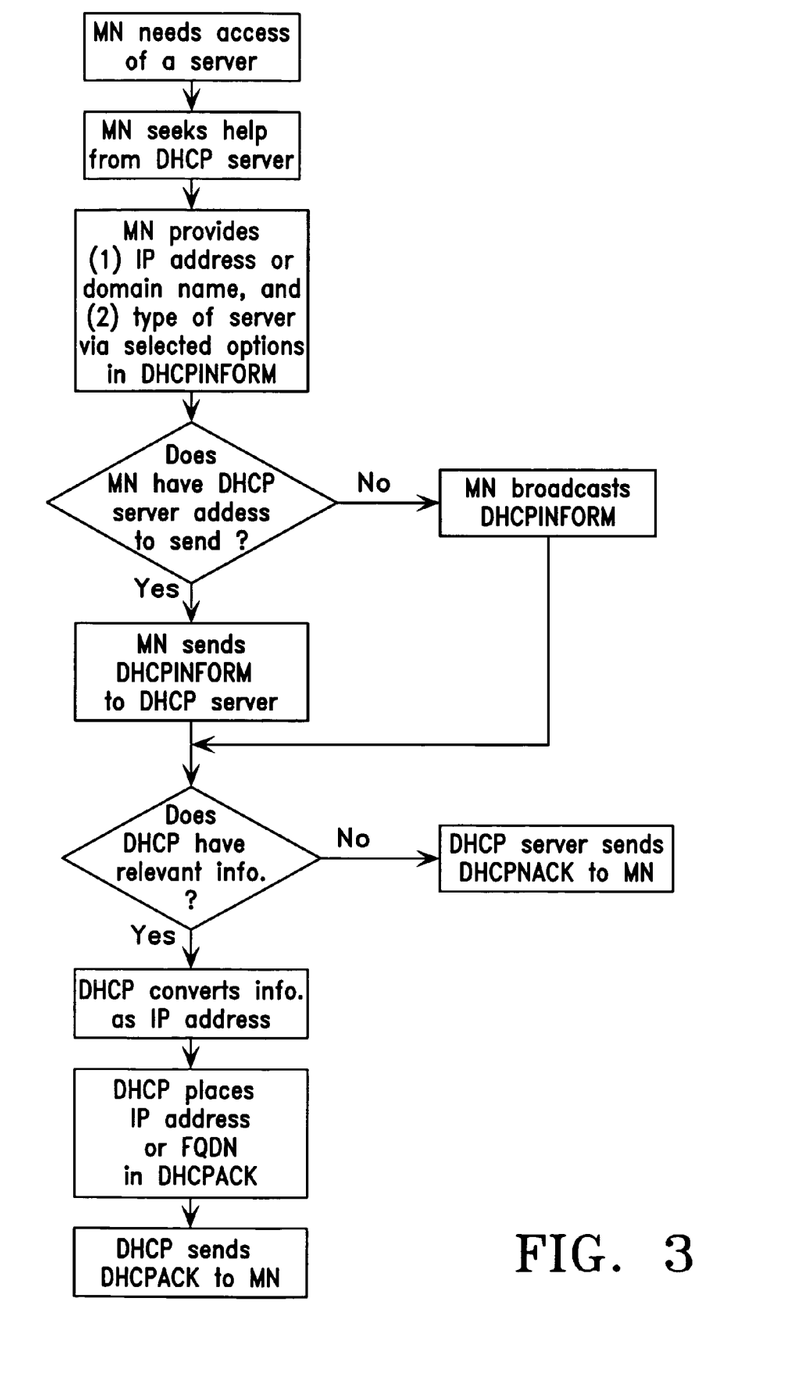
FIG. 3 is flowchart showing the steps in accordance with the first embodiment of the invention.

The process as described above is illustrated in the flowchart of FIG. 3.

Figure 4:
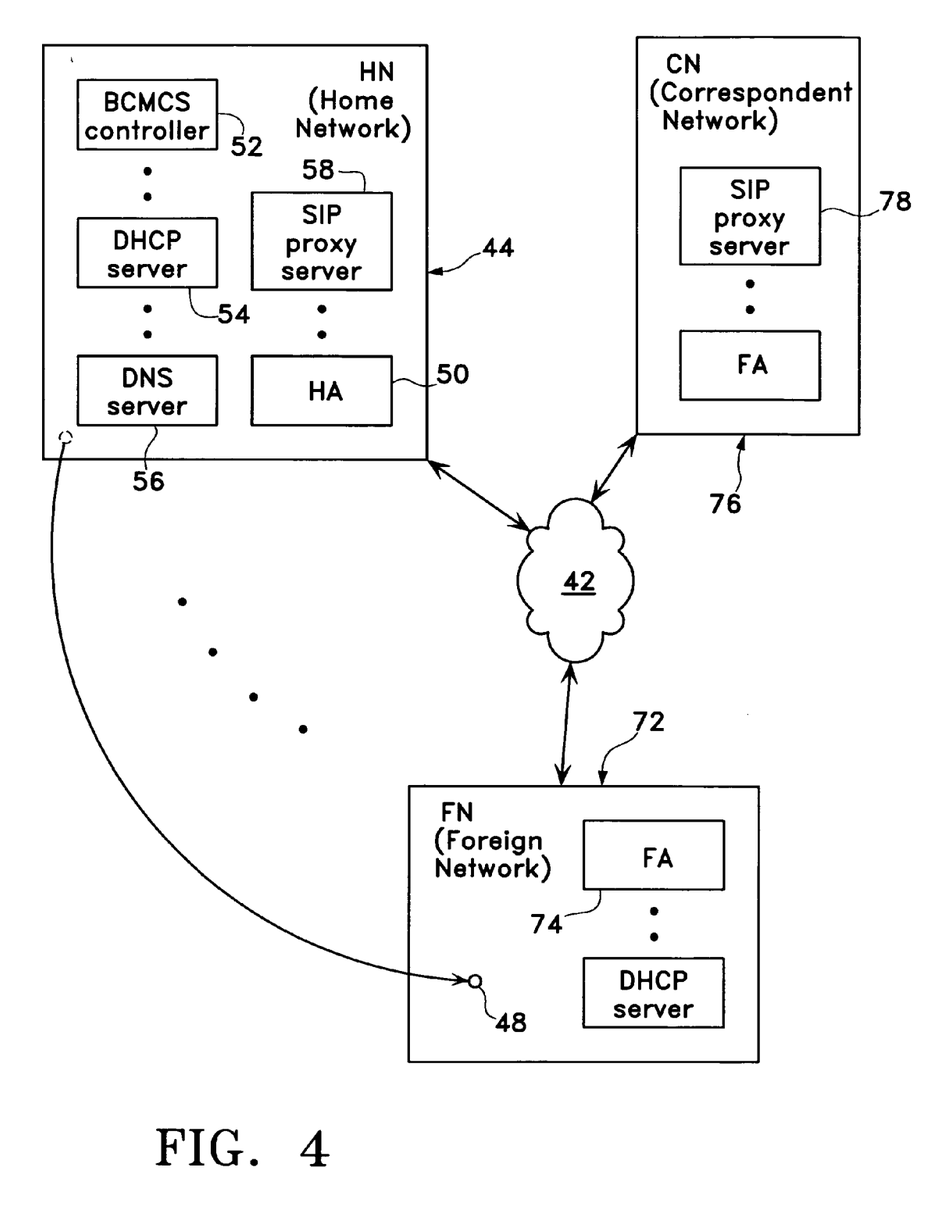
FIG. 4 is a schematic drawing showing a second embodiment of the invention.

FIG. 4 shows another embodiment of the invention. In this embodiment, the duty of the foreign agent in a foreign network, such as the FA 64 in the FN 46 shown in FIG. 2, is dispensed with. Rather, the MN 48 acts as its own agent.

When the MN 48 roams away from the HA 44, instead of requesting a FA CoA (Foreign Agent Care-Of Address), in accordance with the MIP, the MN 48 can request a CCoA (Co-located Care of Address) via a DHCP server in any foreign network where the MN 48 is located at, such as the FN 72 shown in FIG. 4. However, other than the assignment of the CCoA by the FN 72, the MN 48 performs all the functions of a foreign agent. Again, the MN 48 needs to register the CCoA with the HN 44.

For instance, to correspond with a CN (Correspondent Network) 76, the MN 48 sends out a data packet with two layers of addresses. In the outer layer, the source address is set as the CCoA, and the destination address is set as the HA 50. In the inner layer, the source address is the HoA (Home assigned Address) of the MN 48 and the destination address is the address of the CN 76. Upon receipt of the data packet from the roaming MN 48, the HA 50 strips off the outer address layer and resends the data packet to the CN 76 with the inner address layer.

In the reverse data path, that is, when the CN 76 sends a data packet to the MN 48, the data packet has only one address layer with the source address set at the CN 76 and the destination address set at the HoA of the MN 48. Upon receipt of the data packet, the HA 50 encapsulates the data packet with the CCoA as the destination address and resends the data packet to the MN 48. The MN 48 performs the de-encapsulating on its own without going through the FA 74.

In this embodiment, suppose the MN 48 needs to access a SIP proxy server 78. The MN 48 knows there is such a SIP proxy server in the CN 76 but is ignorant of its exact IP address. The MN 48 first needs to locate a DHCP server via direct contact to, for example, one of the networks 44, 72, and 76. Alternatively, a DHCP server can be located via limited broadcast, as explained above. The MN 48 then provides the IP address or domain name of the CN 76 to the chosen DHCP server in a manner as described above. Further, the MN 48 informs the chosen DHCP server the sought server type as a SIP proxy server. The rest of the operation is substantially the same as described in the previous embodiment. For the sake of clarity and conciseness, the operational details are not further repeated.

Figure 5:
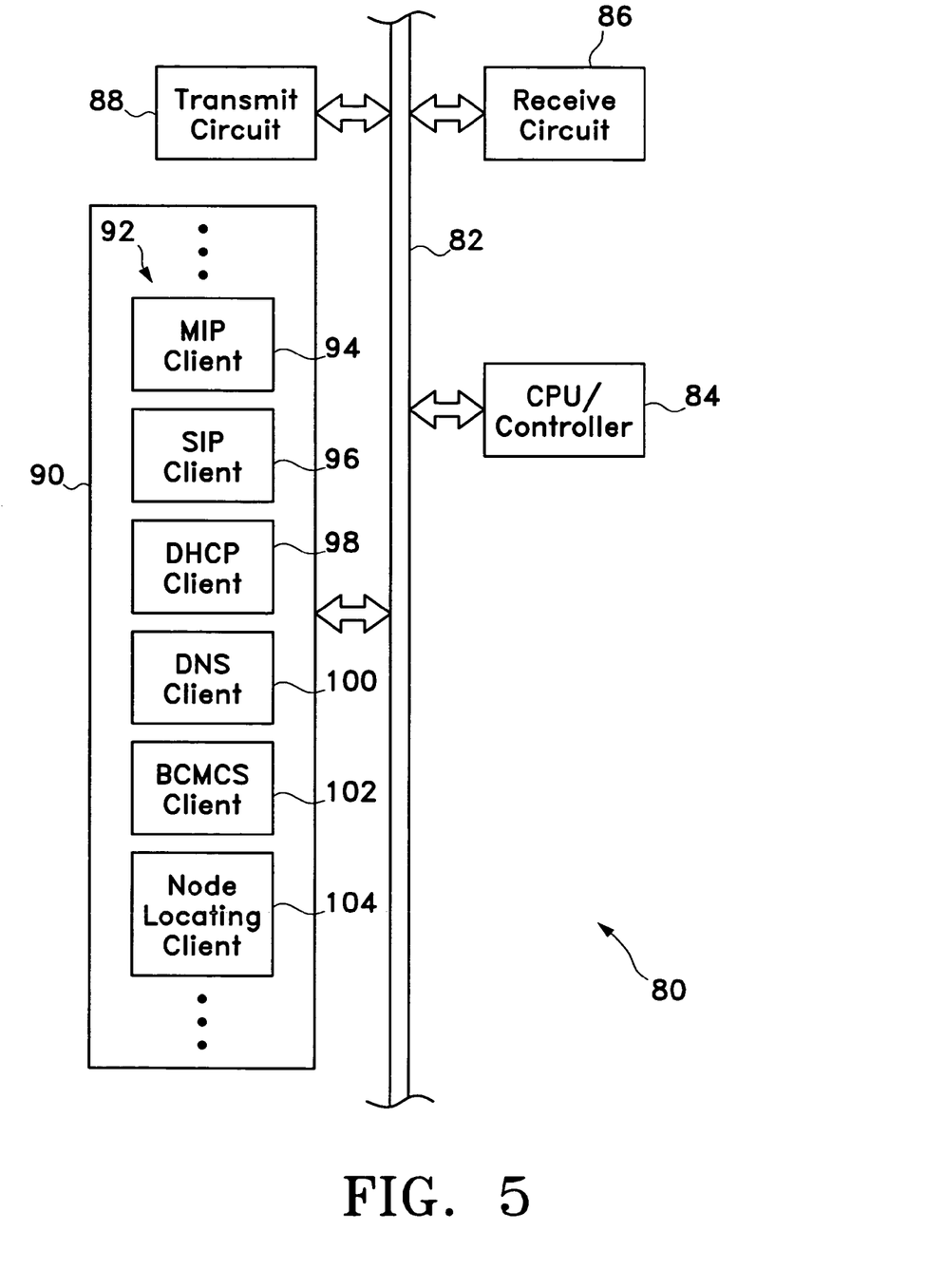
FIG. 5 is a schematic drawing of the circuitry of a mobile node in accordance with the invention.

FIG. 5 schematically shows the part of the hardware implementation of a mobile node apparatus signified by the reference numeral 80 in accordance with the invention. The apparatus 80 can be built and incorporated in various devices, such as a laptop computer, a PDA or a cellular phone. The apparatus 80 comprises a central data bus 82 linking several circuits together. The circuits include a CPU (Central Processing Unit) or a controller 84, a receive circuit 86, a transmit circuit 88, and a memory circuit 90.

The receive and transmit circuits 86 and 88 can be connected to a RF (Radio Frequency) circuit but is not shown in the drawing. The receive circuit 86 processes and buffers received signals before sending out to the data bus 82. On the other hand, the transmit circuit 88 processes and buffers the data from the date bus 82 before sending out of the device 80. The CPU/controller 84 performs the function of data management of the data bus 82 and further the function of general data processing, including executing the instructional content of the memory circuit 90.

The memory circuit 90 includes a set of instructions generally signified by the reference numeral 92. In this embodiment, the instructions include portions such as the MIP client 94, SIP client 96, DHCP client 98, DNS client 100 and BCMCS client 102, node locating client 104, to name just a few. In this embodiment, the memory circuit 90 is a RAM (Random Access Memory) circuit. The exemplary instructions portions 94, 96, 98, 100, 102 and 104 are software modules. The memory circuit 90 can be tied to another memory circuit (not shown) which can either be of the volatile or nonvolatile type. As an alternative, the memory circuit 90 can be made of other circuit types, such as a EEPROM (Electrically Erasable Programmable Read Only Memory), EPROM (Electrical Programmable Read Only Memory), ROM (Read Only Memory), magnetic disk, optical disk, and others well known in the art.

Figure 6:
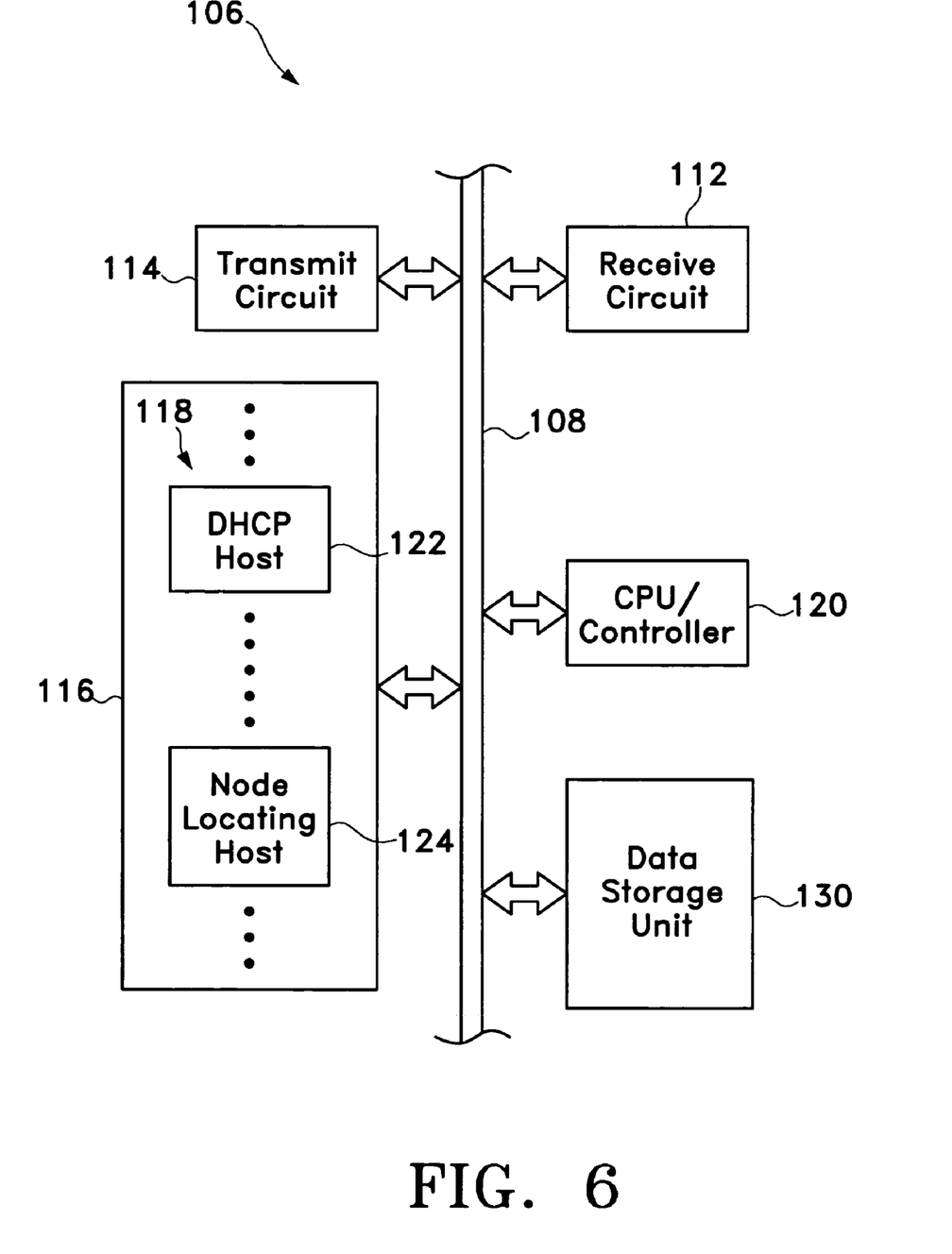
FIG. 6 is a schematic drawing of the circuitry of a configuration server in accordance with the invention.

FIG. 6 schematically shows the part of the hardware implementation of the DHCP apparatus in accordance with the invention and is signified by the reference numeral 106. The DHCP apparatus 106 comprises a central data bus 108 linking several circuits together. The circuits include a CPU (Central Processing Unit) or a controller 120, a receive circuit 112, a transmit circuit 114, a memory circuit 116, and a data storage unit 130.

The receive and transmit circuits 112 and 114 can be connected to a network data bus (not shown) where the DHCP apparatus 106 is linked to. The receive circuit 112 processes and buffers received signals from the network data bus (not shown) before routing to the internal data bus 108. The transmit circuit 114 processes and buffers the data from the date bus 108 before sending out of the apparatus 106. The CPU/controller 120 performs the duty of data management of the data bus 96 and for the function of general data processing, including executing the instructional content of the memory circuit 116.

The memory circuit 116 includes a set of instructions generally signified by the reference numeral 118. In this embodiment, the instructions include portions, among other things, a DHCP host 122 and a node locating host 124. The data storage unit 130 includes past transactional records of the DHCP device 106, which records can be retrievable by the CPU/controller 120 via the data bus 108. The memory circuit 116 and the data storage unit 130 can be made of memory circuit types as mentioned above and are not further repeated. Furthermore, the memory circuit 116 and the data storage unit 130, even though separately shown in FIG. 6, can be fabricated as one unit.

Finally, described in the embodiments are only few networks tied to a backbone network. It should be apparent that a multiplicity of networks can be involved. Furthermore, the mobile node can access other nodes other than the types of nodes described. In addition, any logical blocks, circuits, and algorithm steps described in connection with the embodiments can be implemented in hardware, software, firmware, or combinations thereof. It will be understood by those skilled in the art that theses and other changes in form and detail may be made therein without departing from the scope and spirit of the invention.

What is claimed is:

1. A method of obtaining information in a communication system, comprising:
   identifying a configuration server;
   providing general location information and node type of a communication node being sought in an inform message; and
   sending said inform message to said configuration server to obtain information for said communication node being sought.

2. The method of claim 1 further including:
   receiving from said configuration server an acknowledge message which includes specific location information of said communication node; and
   accessing said communication node using said specific location information.

3. The method of claim 2 wherein said identifying said configuration server includes identifying a DHCP server, said sending said inform message includes sending a DHCPINFORM message, and said receiving said acknowledge message includes receiving a DHCPACK message.

4. The method of claim 2 further including
   acquiring a care-of address prior to said identifying said configuration server.

5. The method of claim 4 wherein said acquiring said care-of address includes acquiring a foreign agent care-of address or a co-located care-of address.

6. The method of claim 1 further including
   broadcasting a search for available configuration servers prior to said configuration server.

7. A method of accessing a target server, comprising:
identifying a DHCP server;
providing general location information of a network and server type of said target server in an inform message;
sending said inform message to said DHCP server;
receiving an acknowledge message which includes specific location information of said target server from said DHCP server; and
accessing said target server using said specific location information.

8. The method of claim 7 wherein said specific location information comprises an IP address of said target server and a domain name of said target server or a domain name of said target server.

9. The method of claim 7 further including
acquiring a care-of address (CoA) prior to said identifying said DHCP server.

10. The method of claim 9 wherein said acquiring said care-of address includes acquiring a foreign agent care-of address (FA CoA) or a co-located care-of address (CCoA).

11. A method of providing information in a communication system, comprising:
receiving an inform message which includes general location information and node type of a communication node being sought;
comparing said general location information and said node type with a stored record; and
generating an acknowledgement message which includes specific location information of said communication node in said communication system if said stored record corresponds with said general location information and said node type.

12. The method of claim 11 wherein said receiving said inform message includes receiving an DHCPINFORM message and wherein said generating said acknowledgement message includes generating a DHCPACK message.

13. The method of claim 11 wherein said specific location information comprises an IP address of said communication node or a domain name of said communication node.

14. An apparatus in a communication system, comprising:
means for identifying a configuration server;
means for providing general location information and node type of a communication node being sought in said communication system in an inform message; and
means for sending said inform message to said configuration server to obtain information for said communication node being sought.

15. The apparatus of claim 14 further including:
means for receiving from said configuration server an acknowledge message which includes specific location information of said communication node; and
means for accessing said communication node using said specific location information.

16. The apparatus of claim 14 further including
means for acquiring a care-of address.

17. The apparatus of claim 16 wherein said care-of address comprises a foreign agent care-of address or a co-located care-of address.

18. An apparatus for locating a target server, comprising:
means for identifying a DHCP server;
means for providing general location information of a network and server type of said target server being sought in an inform message;
means for sending said inform message to said DHCP server;
means for receiving an acknowledge message which includes specific location information of said target server from said DHCP server; and
means for accessing said target server using said specific location information.

19. The apparatus of claim 18 wherein said specific location information comprises an IP address of said target server or a domain name of said target server.

20. The apparatus of claim 19 further including
means for acquiring a care-of address (CoA) for said apparatus.

21. The apparatus of claim 20 wherein said care-of address comprises a foreign agent care-of address (FA CoA) or a co-located care-of address (CCoA).

22. An apparatus in a communication system, comprising:
means for receiving an inform message including general location information and node type of a communication node being sought;
means for comparing said general location information and said node type with a stored record; and
means for generating an acknowledgement message which includes specific location information of said communication node in said communication system if said stored record corresponds with said general location information and said node type.

23. The apparatus of claim 22 wherein said specific location information comprises an IP address of said communication node or a domain name of said communication node.

24. The apparatus of claim 22 wherein said inform message includes a DHCPINFORM message and said acknowledgement message includes a DHCPACK message.

25. An apparatus in a communication system, comprising:
a memory circuit having computer-readable instructions for identifying a configuration server, providing general location information and node type of a communication node being sought in an inform message, and sending said inform message to said configuration server to obtain information for said communication node being sought; and
a processor circuit coupled to said memory circuit for processing said computer-readable instructions.

26. The apparatus of claim 25 wherein said memory circuit further including computer-readable instructions for receiving from said configuration server an acknowledge message which includes specific location information of said communication node, and accessing said communication node using said specific location information.

27. An apparatus for locating a target server, comprising:
a memory circuit having computer-readable instructions for identifying a DHCP server, providing general location information of a network and server type of said target server being sought in an inform message, sending said inform message to said DHCP server, receiving an acknowledge message which includes specific location information of said target server from said DHCP server, and accessing said target server using said specific location information; and
a processor circuit coupled to said memory circuit for processing said computer-readable instructions.

28. The apparatus of claim 27 wherein said specific location information comprises an IP address of said target server or a domain name of said target server.

29. An apparatus in a communication system, comprising:
a memory circuit having computer-readable instructions for receiving an inform message which includes general location information and node type of a communication node being sought in said communication system, comparing said general location information and said node type with a stored record, and generating an acknowledgement message which includes specific location information of said communication node in said communication system if said stored record corresponds with said general location information and said node type; and a processor circuit coupled to said memory circuit for processing said computer-readable instructions.

30. The apparatus of claim 29 wherein said specific location information comprises an IP address of said communication node or a domain name of said communication node.

31. The apparatus of claim 30 wherein said inform message includes a DHCPINFORM message and said acknowledgement message includes a DHCPACK message.

* * * * *